United States Patent [19]
Yamamoto et al.

[11] Patent Number: 5,258,971
[45] Date of Patent: Nov. 2, 1993

[54] OPTICAL DISC DRIVE WITH INTERCONNECTING HOODS

[75] Inventors: Hiroshi Yamamoto; Takashi Naito, both of Kanagawa, Japan

[73] Assignee: Sony Corporation, Japan

[21] Appl. No.: 889,144

[22] Filed: May 27, 1992

[30] Foreign Application Priority Data

May 31, 1991 [JP] Japan .................. 3-155458

[51] Int. Cl.$^5$ .............. G11B 7/00; G11B 7/08; G11B 7/12
[52] U.S. Cl. ............... 369/219; 369/44.14; 369/244.215; 359/811
[58] Field of Search ........... 369/215, 219, 220, 114, 369/244, 44.14; 359/811, 815, 819, 822

[56] References Cited

U.S. PATENT DOCUMENTS

| | | | |
|---|---|---|---|
| 4,958,335 | 9/1990 | Takeda et al. | 369/44.14 |
| 5,072,436 | 12/1991 | Honda | 369/44.14 X |
| 5,097,456 | 3/1992 | Tanoshima et al. | 369/244 X |
| 5,159,587 | 10/1992 | Kibune | 369/44.14 |

FOREIGN PATENT DOCUMENTS

| | | | |
|---|---|---|---|
| 58-220253 | 12/1983 | Japan | 369/44.14 |
| 61-45426 | 3/1986 | Japan | 369/44.14 |
| 1691884 | 11/1991 | U.S.S.R. | 369/44.14 |

OTHER PUBLICATIONS

Patent Abstracts of Japan, vol. 13, No. 409, Sep. 11, 1989.
Patent Abstracts of Japan, vol. 11, No. 29, Jan. 28, 1987, Kokai No. 61-198-443.
Patent Abstracts of Japan, vol. 11, No. 29, Jan. 28, 1997, Kokai No. 61-194-444.

Primary Examiner—Stuart S. Levy
Assistant Examiner—Joseph A. Rhoa
Attorney, Agent, or Firm—Ronald P. Kananen

[57] ABSTRACT

An optical disc drive device includes an optical unit (10) and a movable pickup (11). The optical unit is fixedly provided on a chassis and has a light source for radiating a light beam towards an optical disc (13) and a light receiving section for receiving a return light beam reflected from the optical disc. The movable pickup is supported on the chassis for movement along the radius of the optical disc and has an object lens (22) for converging the light beam radiated from the light source to the surface of the optical disc and a driving unit for driving the object lens at least in a direction along its optical axis. The optical disc drive device further includes a first light incident-light outgoing section (1) for the light beam provided on the optical unit and a second light incident-light outgoing section (2) for the light beam provided on the movable pickup. The first and the second hoods (3,4) are fitted one into the other when the movable pickup approaches the optical unit.

6 Claims, 10 Drawing Sheets

OPTICAL DISC DRIVE WITH INTERCONNECTING HOODS

BACKGROUND OF THE INVENTION

1. Field of the Invention

This invention relates to an optical disc drive device comprising an optical unit and a movable pickup in which the optical unit is fixedly provided on a chassis and has a light source for radiating a light beam towards an optical disc and a light receiving section for receiving a return light beam reflected from the optical disc, the movable pickup is supported on the chassis for movement along the radius of the optical disc and has an object lens for converging the light beam radiated from the light source to the surface of the optical disc and driving means for driving the object lens at least in a direction along its optical axis. More particularly, it relates to an optical disc drive device in which dust and dirt or the like foreign matter may be prevented from being deposited on the light incident-light outgoing sections of the optical unit and the movable pickup to assure protection of the light incident-light outgoing sections.

2. Description of the Prior Art

An optical disc apparatus is provided in a known manner with an optical pickup device for reproducing information signals recorded on the optical disc or recording information signals on the optical disc.

The optical pickup device includes an optical unit, provided with a light source, such as a semiconductor laser, radiating a light beam to the optical disc, and a light receiving section, such as photodetector(s), for receiving the light beam reflected from the optical disc, and an object lens unit, provided with an object lens for converging the light beam radiated from the light source to the disc surface and a lens driving section for driving and displacing the object lens at least along the optical axis of the object lens.

A conventional optical pickup is constituted by an optical unit provided with a light source and a photodetector(s) and an object lens nit formed as one with the optical unit. The optical unit and the object lens unit are moved in their entirely along the radius of the optical disc by a pickup drive and a recording track(s) of the optical disc is tracked y an optical beam for reading out information signals recorded on the optical disc or recording information signals on the optical disc.

With the above described optical disc drive device employing the optical pickup device, in which the optical unit is constituted as one with the object lens unit, the optical unit and the object lens unit need to be displaced in their entirety, so that the optical pickup device needs to be moved through a larger distance, while the pickup drive is increased in size. Consequently, it becomes extremely difficult to reduce the size of the optical disc drive.

An optical disc drive has been proposed in which the optical unit and the object lens unit are constituted independently of each other and the optical unit is fixedly provided on a chassis provided within the main body of the disc drive device while only the movable pickup including the object lens is supported on the chassis for movement along the radius of the optical disc.

With the optical disc drive device in which the optical unit is provided in this manner, separately from the movable pickup device, the light beam exiting from the light source provided in the optical unit is transmitted through the optical disc drive device via the light incident and exiting section and deflected in its proceeding direction by a reflecting mirror or the like so as to be incident on the object lens via the light incident and exiting section provided in the movable pickup device. The light beam is then converged by the object lens so that the converged light is radiated to a signal recording region of the optical disc. The return light beam, reflected from the optical disc, is incident on the optical unit via an optical path which is the reverse of the light path followed by the above-mentioned light beam incident on the optical disc, and is detected by the light receiving section provided in the optical unit.

Meanwhile, with the above-described optical disc drive in which the optical unit is provided separately from the movable pickup device, since the light beam is transmitted through the light path in the optical disc drive device between the optical unit and the movable pickup device, the optical unit and the movable pickup device are provided with respective light beam incident and exiting sections. That is, with the optical pickup device in which the optical unit is formed as one with the object lens unit, only the object lens is laid open to outside, whereas, with the optical disc drive in which the optical unit is provided separately from the movable pickup device, not only the object lens provided in the movable pickup section but also the light beam incident and exiting sections, provided in the optical unit and in the movable pickup device, is laid open to outside.

If dust and dirt or the like foreign matter is deposited on the light beam incident and exiting section, the light beam undergoes irregular reflection, so that the amount of the light beam transmitted through the optical unit and the movable pickup device is decreased. The result is that a sufficient amount of the light beam cannot be radiated to the signal recording region of the optical disc, while the amount of the return light beam reflected from the optical disc is decreased. Thus the readout signal, obtained by detecting the return light beam at the light receiving section, is collapsed in waveform to render it impossible to reproduce information signals with optimum playback characteristics.

On the other hand, with an optical disc drive device in which a rewritable magneto-optical disc is used as a recording medium, since the amount of the light beam transmitted through the optical unit and the movable pickup device is decreased in this manner, the light beam is radiated on the signal recording region of the magneto-optical disc with only an insufficient power to produce troubles in writing the information signals.

OBJECTS AND SUMMARY OF THE INVENTION

It is an object of the present invention to provide an optical disc drive device in which dust and dirt or the like foreign matter may be prevented from being deposited in the light beam incident and exiting (outgoing) sections provided in the optical pickup unit and in the movable pickup device.

It is another object of the present invention to provide an optical disc drive device in which, when ejecting a disc cassette loaded in a cassette loading section, the movable pickup device is moved towards the optical unit to render it possible to close the light beam incident and exiting section.

It is a further object of the present invention to provide an optical disc drive device in which the movable pickup device may be moved during the non-operating state of the drive device to a position close to the optical pickup section to render it possible to maintain the closed state of the light beam incident and exiting section.

The present invention provides an optical disc drive device comprising an optical unit and a movable pickup, said optical unit having a light source for radiating a light beam towards an optical disc and a light receiving section for receiving a return light beam reflected from said optical disc, said optical unit being fixedly provided on a chassis, said movable pickup having an object lens for converging the light beam radiated from said light source to the surface of said optical disc and driving means for driving said object lens at least in a direction along its optical axis, said movable pickup being supported on said chassis for movement along the radius of said optical disc, said optical disc drive device further comprising light incident-light outgoing sections for the light beam provided on the optical unit and on the movable pickup for facing each other, and hoods provided on the light incident and light outgoing sections so as to be engaged with each other when the movable pickup device approaches the optical unit.

By moving the movable pickup towards the optical unit, the hoods provided on the movable pickup and on the optical unit are engaged with each other to close the incident/outgoing areas of the light incident-light outgoing sections.

Other objects and advantages of the present invention will become clear from reading the following description.

DETAILED DESCRIPTION OF THE PREFERRED EMBODIMENTS

Referring to the drawings, preferred embodiments of the present invention will be explained in detail.

Figure 1:
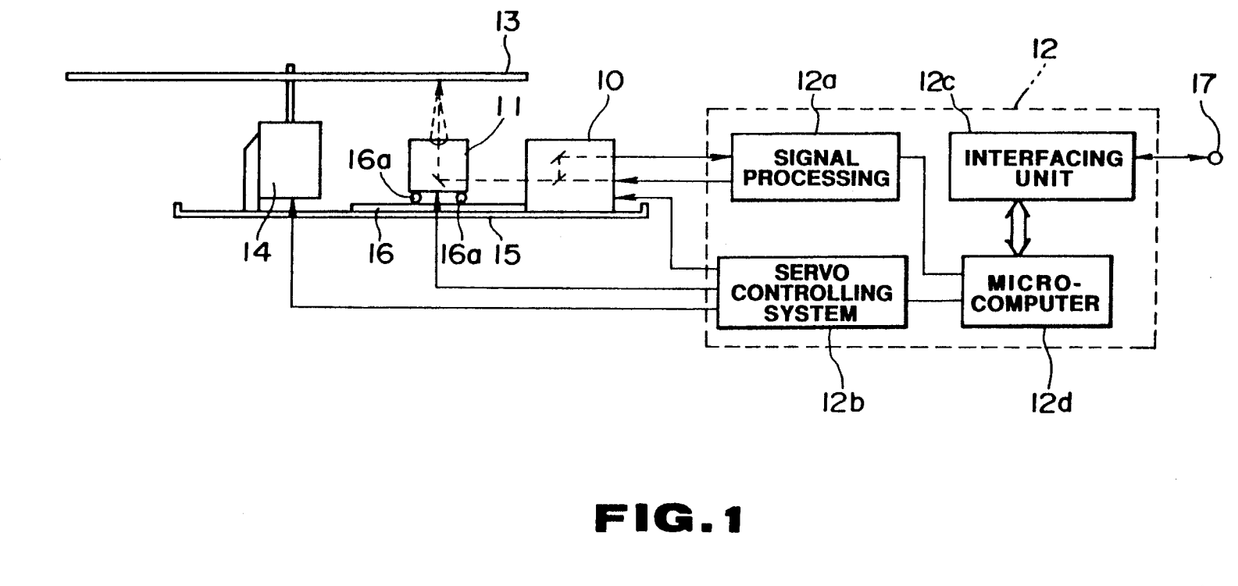
FIG. 1 is a block diagram showing the optical disc drive device of the present invention along with a controlling system therefor.

Referring to FIG. 1, an optical disc drive device according to the present invention includes an optical unit 10, provided with a light source, such as a semiconductor laser, for radiating a light beam to an optical disc 13, and a light receiving section, such as a photodetector(s), for receiving the return light beam reflected from the optical disc 13, and a movable pickup device 11, provided with an object lens for converging the light beam radiated from the light source to the optical disc surface and a lens driving section for driving and displacing the object lens at least along the optical axis of the object lens.

The driving of the optical unit 10 and the movable pickup device 11 is controlled by a controlling system 12 which is arranged as shown in FIG. 1. That is, the present optical disc drive device is adapted for radiating the light beam exiting from the light source in the optical unit 10 to the optical disc 13 via the optical pickup device 11 to write information signals on the disc, while being adapted for receiving and detecting the return light beam reflected from the signal recording area of the optical disc 13 by the light receiving section provided within the optical unit 10 to read information signals recorded on the disc. In operation, the optical unit 10 converts the information signals supplied as electrical signals from the controlling system 12 into light signals and radiates the light signals as a light beam on the optical disc, while converting the light signals as a return light beam reflected from the optical disc into electrical signals to supply these electrical signals to the controlling system 12.

The devices or units controlled by the controlling system 12, that is the optical unit 10, the movable pickup device 11 and a spindle motor 14, rotationally driving the optical disc 13, are mounted on a chassis 15 provided within a cabinet of the main body of the optical disc drive device.

The movable pickup device 11 is supported for being moved radially of the optical disc 13 via a guide rail 16 provided on the chassis 15 provided in turn within the cabinet of the main body of the disc drive device. On the other hand, the optical unit 10 is fixedly mounted on the chassis 15.

The movable pickup device 11 is moved on the guide rail 16 in a direction parallel to the path of the light beam radiated from the optical unit 10, or the return light beam reflected from the optical disc 13, under control of the controlling system 12. The movable pickup device 11 is moved in this manner by a feed screw which is driven rotationally by a driving motor or a linear motor provided in parallel with the guide rail 16, in a manner not shown.

Although the movable pickup device 11 is provided with rolls 16a on its lower surface and is adapted for being moved on the guide rail 16 by means of these rolls 16a, the movable pickup device may be supported on the guide rail 16 by any suitable means, such as bearings.

Figure 2:
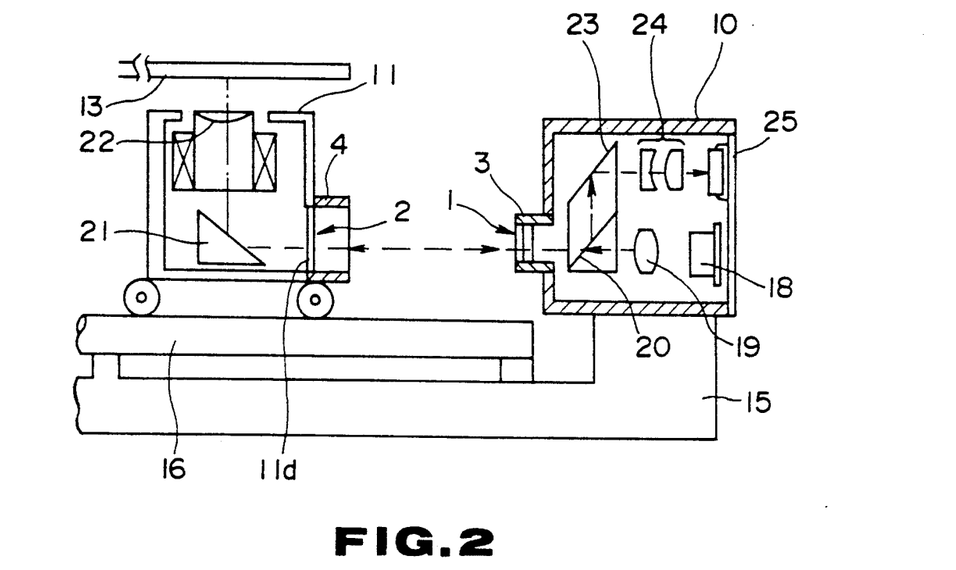
FIG. 2 is a cross-sectional side elevation showing a schematic arrangement of a movable pickup device and an optical unit of the optical disc drive device shown in FIG. 1.

Referring to FIG. 2, the optical unit 10, mounted fixedly on the chassis 15, is provided with a first light incident-light outgoing section 1 for conducting the light beam exited from the light source or transmitting the return light beam reflected from the optical disc 13. Similarly, the movable pickup device 11 is provided with a second light incident-light outgoing section 2 for conducting the light beam exited from the optical unit 10 and for transmitting the return light beam reflected from the optical disc 13 towards the optical unit 10. These first and second light incident-light outgoing sections 1, 2, provided in the optical unit 10 and in the movable pickup device 11, respectively, are provided facing each other with the center lines thereof coincident with the optical axis of the light beam transmitted therethrough. The first and second light incident-light outgoing sections 1, 2 are surrounded by first and second tubular hoods 3, 4, which delimit effective light incident-light outgoing areas of the sections 1, 2, respectively. These first and second hoods 3, 4 are fitted one in the other when the movable pickup device 11 is moved towards and into close proximity of the stationary optical unit 10 for closing the effective light incident-light outgoing areas of the sections 1, 2.

Figure 3:
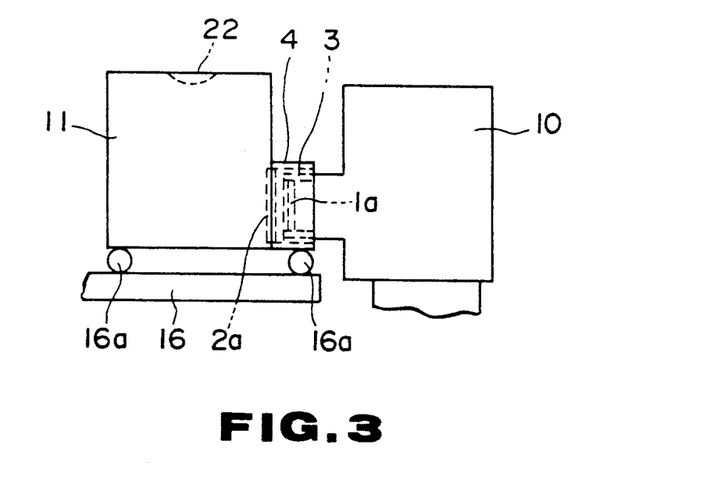
FIG. 3 is a side elevation showing the state in which the movable pickup device and the optical unit of the optical disc drive device shown in FIG. 2 are moved towards each other until first and second hoods are fitted one into the other.

Meanwhile, one of the hoods 3 or 4 is set so as to be larger in diameter than the other. In the present embodiment, the first hood 4 of the movable pickup device 11 has a diameter larger than that of the first hood 3 of the optical unit 10. By setting one of the hoods 3, 4 so as to be larger in diameter than the other, these hoods 3, 4 may be prevented from being slidingly contacted against each other when fitted one into the other as shown in FIG. 3 to prevent the debris from being produced by the sliding contact between the first and the second hoods 3, 4.

The first light incident-light outgoing section 1 provided in the optical unit 10 and the second light incident-light outgoing section 2 provided in the movable pickup unit 11 are closed by light-transmitting plates, such as glass plates 1a, 2a, capable of transmitting the light beam therethrough. These light-transmitting plates 1a, 2a play the role of preventing the dust and dirt from being intruded into the optical unit 10 and the movable pickup device 11 via the first and second light incident-light outgoing sections 1, 2.

The optical unit 10, a component of the optical disc drive device according to the present invention, is hereinafter explained. The optical unit 10 converts electrical signals supplied from a signal processing unit 12a of the controlling system 12 arranged as shown in FIG. 1 into a light beam as an optical signal by a laser oscillator 18, such as a semiconductor laser, to cause the light beam to be incident into a deflection beam splitter 20 via a collimator lens 19. This light beam is deviated 90° by a prism 21 in the movable pickup device 11 so as to be radiated perpendicularly to the signal recording surface of the optical disc 13. The light beam is converged by an object lens 22 on the signal recording surface of the optical disc 13.

The light beam thus radiated by the optical unit 10 so as to be radiated on the signal recording surface of the optical disc 13 and reflected by the optical disc 13 as the return light beam is incident on a deflection beam splitter 20 after its deflection plane is rotated by, for example, a ¼ wavelength plate, not shown. The deflection beam splitter 20 is arranged at an angle of 45° with respect to the optical axis of the light beam for reflecting the light beam towards a reflecting mirror 23. Since the reflecting mirror 23 is arranged parallel to the deflection beam splitter 20, the return light beam, reflected by the mirror 23, is parallel to the incident light beam radiated by the laser oscillator 18. The return light beam is converted into electrical signals by a light detector 25, such as a photodetector, via a converging lens system 24, so as to be read out as information signals.

The controlling system 12, controlling the optical unit 10 and the movable pickup device 12 as the components of the optical disc drive device according to the present invention, is made up of a signal processing unit 12a, a driving controlling unit 12b, an interfacing unit 12c and a microcomputer 12d, as shown in FIG. 1.

The signal processing unit 12a of the controlling system 12 has the function of converting the information signals recorded on the optical disc 13 into recording data which may be recorded on the optical disc 13 or of converting the read-out data read out from the optical disc 13 into playback information signals. The driving controlling unit 12b controls the movement of the movable pickup device 11 along the radius of the optical disc 13, while controlling the rotational driving of a spindle motor 11 rotationally driving the optical disc 13 and the operation of an object lens driving unit 22a for driving the object lens 22 responsive to focusing error signals and tracking error signals.

The driving controlling unit 12b also controls a disc cassette loading unit adapted for loading the optical disc 13 on the present optical disc drive device.

The interfacing unit 12c takes charge of data exchange between the controlling system 12 and a computer provided outside of the controlling system 12 via an input/output terminal 17. Data of the external computer, supplied to the interfacing unit 12c, is supplied via the micro-computer 12d to the signal processing unit 12a and to the servo controlling unit 12b.

Figure 4:
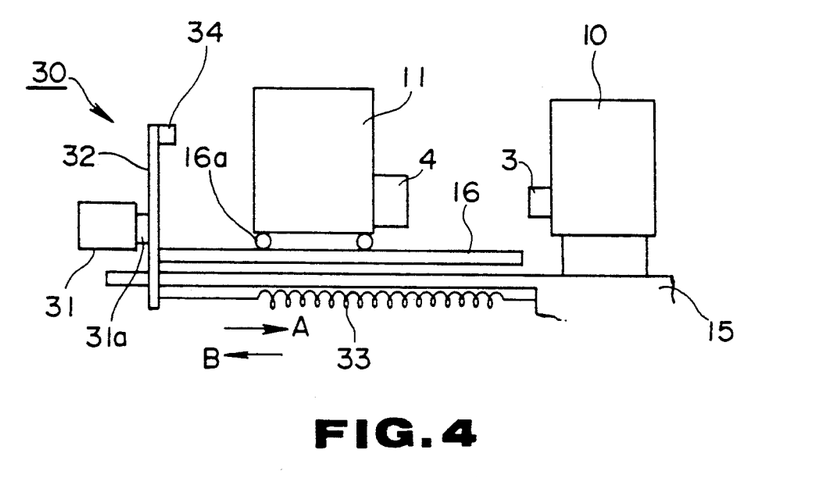
FIG. 4 is a side elevation showing the state in which the movable pickup device is moved on a guide rail when the drive device is in operation.

The optical disc drive device is provided with a movable pickup holding unit 30 adapted for holding the movable pickup device 11 at a position closely proximate to the optical unit 10 so that the first and second hoods 3 and 4 are fitted one into the other when the disc drive device is at the nonoperative position of not recording or reproducing information signals on or from the disc. Referring to FIG. 4, the movable pickup holding unit 30 is made up of a thrusting lever 32 for thrusting the movable pickup device 11 towards the optical unit 10 under the bias of a tension spring 33 and a thrusting lever attracting and holding unit 31 comprised of an electro-magnetic plunger including an electro-magnet for attracting the thrusting lever 32 in a direction away from the movable pickup device 11 against the bias of the tension spring 33.

Referring to FIG. 4, the thrusting lever 32 of the movable pickup holding unit 30, having a thrusting part 34 facing the back side of the movable pickup device 11 opposite to the side thereof provided with the second incident-outgoing section 2, is supported on the chassis 15 for movement in the same direction as the proceeding direction of the movable pickup device 11, as indicated by an arrow A, and in the direction opposite thereto, as indicated by an arrow B.

Figure 5:
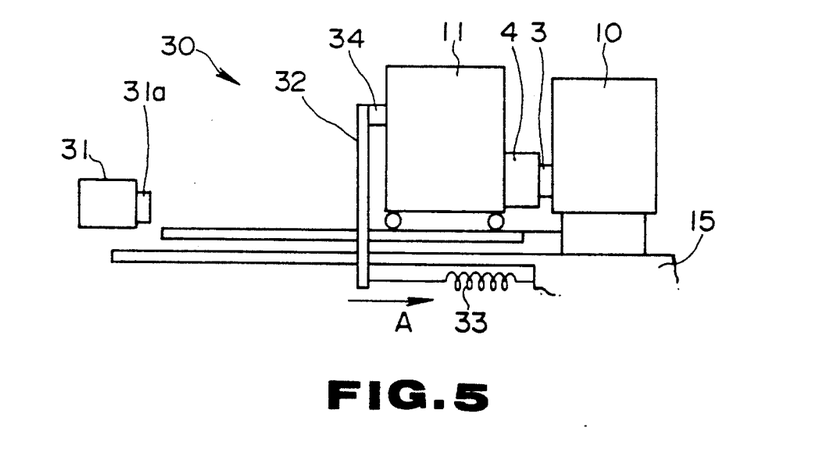
FIG. 5 is a side elevation showing the state in which the movable pickup device is moved towards the optical unit by a tension spring when the drive device is not in operation.

When the optical disc drive device is not in operation, no electrical current is supplied to the thrusting lever attracting and holding unit 31 composed mainly of the electro-magnet. Thus the thrusting lever 32 is biased by the tension spring 33 in the direction shown by arrow A in FIG. 5 for thrusting the movable pickup device 11 by the thrusting part 34. The movable pickup 11, thus thrust by the thrusting lever 32, is maintained at a position in which it has been shifted to the position closely proximate to the optical unit 10 which is arranged fixedly on the chassis 15. At this time, the first and second hoods 3, 4 are fitted one into the other for closing the first and second light incident-light outgoing sections 1, 2 provided on the optical unit 10 and on the movable pickup device 11, respectively.

When the optical disc drive device is in the operative state, and the information signal recording and/or reproducing mode is selected, the electrical current is supplied to the thrusting lever attracting and holding unit 31 for attracting the thrusting lever 32 of a magnetic material against the bias of the tension spring 33 for displacing the thrusting lever 32 in the direction shown by arrow B in FIG. 4 until being sucked and held in position by a magnetic attracting part 31a of the thrusting lever attracting and holding unit 31. With the thrusting lever 32 thus attracted and sucked by the magnetic attracting part 31a of the thrusting lever attracting and holding unit 31, the thrusting of the movable pickup device 11 by the thrusting lever 32 is interrupted so that the movable pickup device 11 may be moved along the radius of the optical disc 13 by being guided along the guide rail 16.

An embodiment of the present invention, applied to an optical disc drive device provided with a cassette loading unit 100 for loading a disc cassette housing the optical disc 13 on a cassette loading section 101 arranged on the chassis 15, on which the optical unit 10 and the movable pickup device 11 are arranged, is hereinafter explained.

Those parts or components which are the same as those of the preceding embodiment are indicated by the same reference numerals and detailed description is omitted for simplicity.

Figure 6:
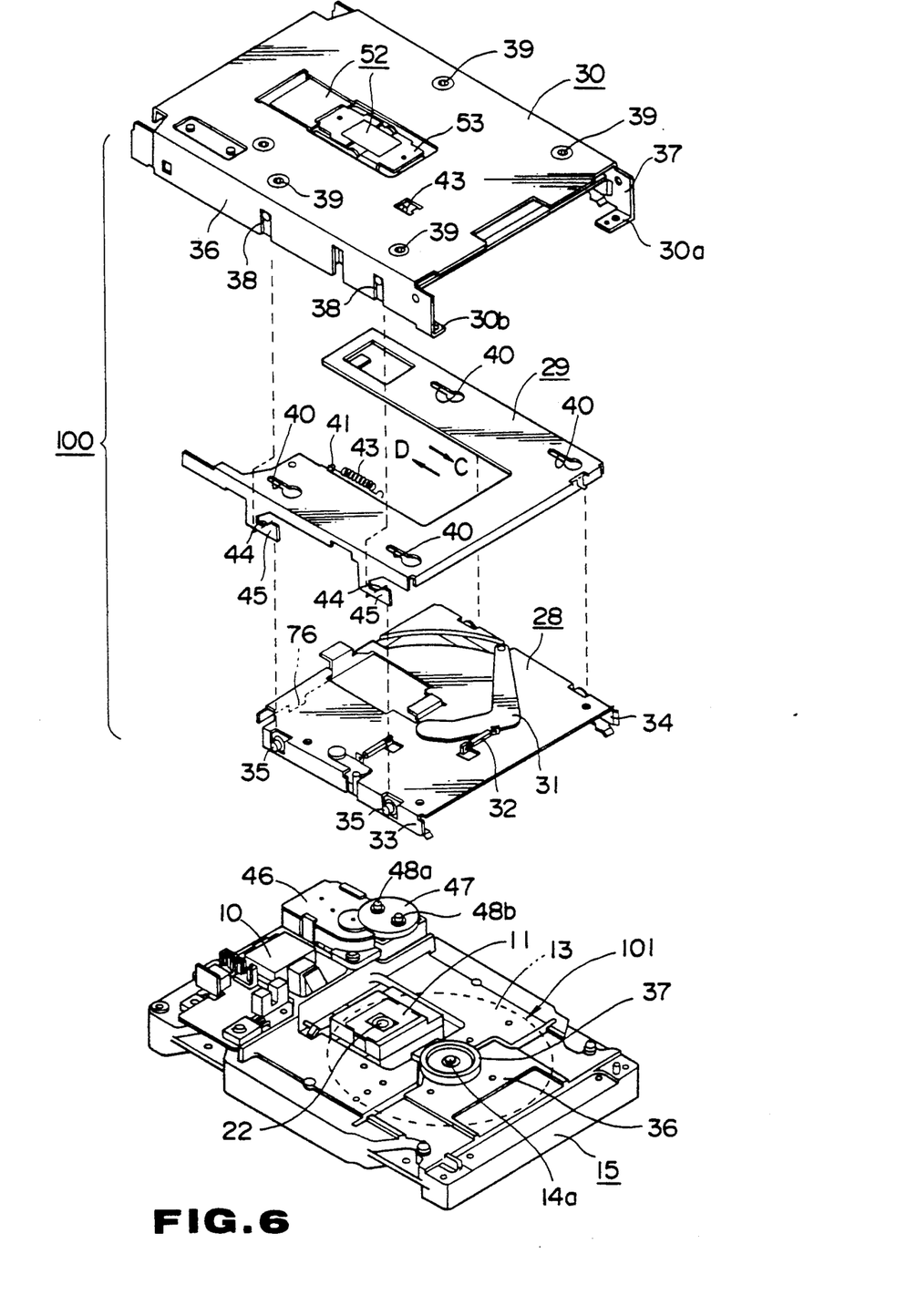
FIG. 6 is an exploded perspective view showing an example of application of the present invention to an optical disc drive device provided with a cassette loading unit.
Figure 7:
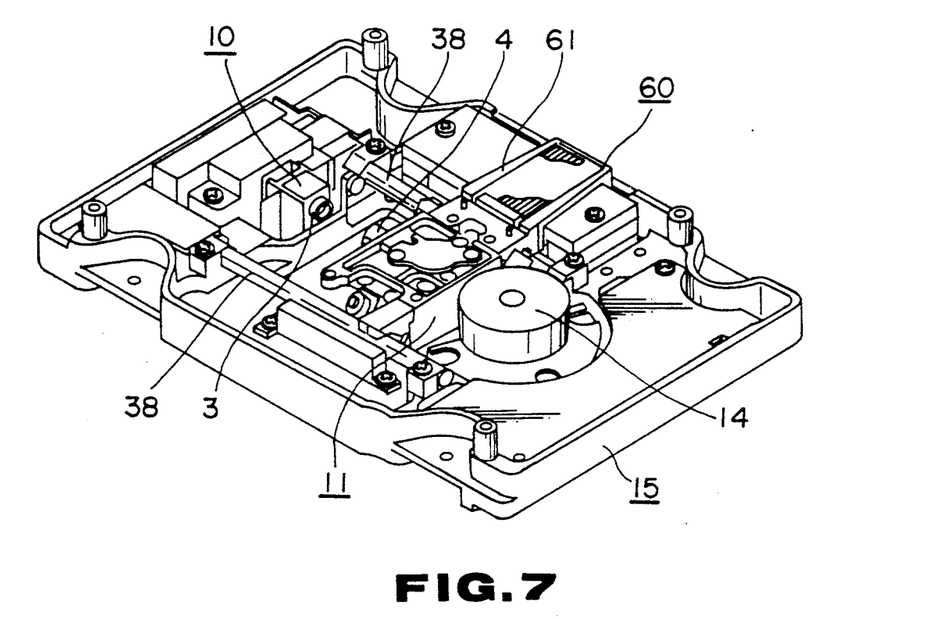
FIG. 7 is a perspective view showing the lower side of a chassis of the optical drive device shown in FIG. 6.

Turning to the schematics of the optical disc drive device, a disc rotating and driving device 36 for rotating the optical disc 13 accommodated in the disc cassette loaded on the cassette loading section 101 arranged on the upper surface of the chassis 15 is arranged on the chassis 15. Referring to FIGS. 6 and 7, the disc rotating and driving device 36 is made up of a spindle motor 14 and a disc table 37 attached to the distal end of a spindle shaft 14. The spindle motor 14 is mounted on the lower surface of the chassis 15, with the spindle shaft 14a being protruded on the upper surface of the chassis 15, on the upper surface of which the cassette loading section 101 is provided, as shown in FIG. 7. The disc table 37, on which the optical disc 13 is fixedly set, is mounted integrally on the distal end of the spindle shaft 14a protruded on the upper surface of the chassis 15.

The optical disc 13, housed in the disc cassette loaded on the cassette loading section 101, is fixedly set on the disc table 37 by having the disc hub at the center of the disc held by the disc table 37, and is rotationally driven with rotation of the spindle motor 14.

The movable pickup device 11 is movably mounted on the chassis 15 so that the light beam transmitted through the object lens 22 may scan a radially extending region of the optical disc 13 set on the disc table 25.

That is, the movable pickup device 11 is supported for being moved along the radius of the optical disc 13 by means of a pair of slide guide shafts 38, 38 mounted on the lower surface of the chassis 15 for extending in a direction parallel to the radius of the optical disc 13 set on the disc table 25, as shown in FIG. 7. At this time, the object lens 22 transmitting the light beam is faced by the optical disc 13 set on the disc table 25.

The movable pickup device 11 is connected to a movable part 61 of a linear motor 60, mounted on the lower surface of the chassis 15, as shown in FIG. 7, so that the pickup device 11 is moved by the linear motor 60 along the radius of the optical disc 13.

Figure 8:
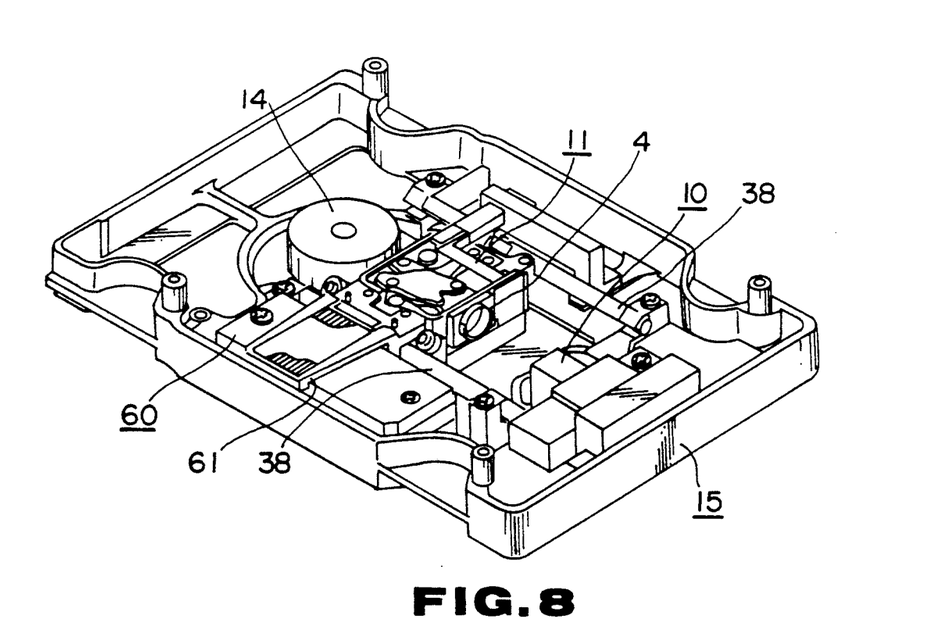
FIG. 8 is a perspective view, as seen from the opposite side, showing the lower side of the chassis of the optical drive device shown in FIG. 6.

On the other hand, the optical unit 10 is mounted on the chassis 15 for facing the movable pickup device 11, as shown in FIGS. 7 and 8. That is, the optical unit 10 is arranged facing the movable pickup device 11 so that a first light incident section 1 of the optical unit 10 has its optical axis aligned with the second light-incident section 2 of the movable pickup device 11. When the movable pickup device 11 is moved to the position closely proximate to the optical unit 10 fixedly mounted on the chassis 15, the second hood 4 provided on the second light-incident section 2 is engaged with the first hood 3 of the optical unit 10 one within the other.

The cassette loading unit 100, adapted for loading the disc cassette, housing the optical disc 13 therein, on the cassette loading section 101 arranged on the upper surface of the chassis 15, includes a cassette holder 28, into which a disc cassette is introduced by means of a cassette inlet/outlet 27 and which is adapted for holding the disc cassette thus introduced on the cassette holding section 101, an ejecting plate 29 for raising the cassette holder 28 lowered onto the cassette loading section 101 for ejecting the disc cassette introduced into the cassette holder 28, and a loading frame 30 for supporting the cassette holder 28 so as to be movable vertically with respect to the chassis 15 and slidably supporting the ejecting plate 29.

Figure 10:
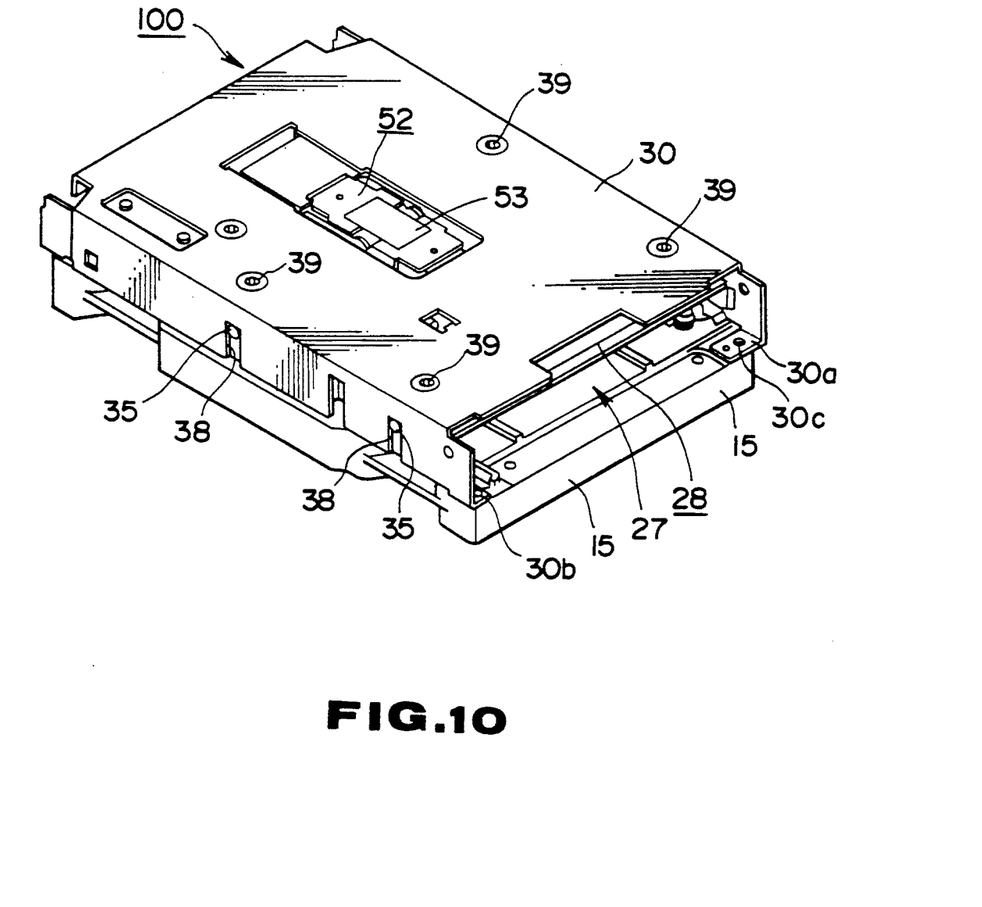
FIG. 10 is an overall perspective view showing the optical disc drive device provided with the cassette loading unit of the present invention.

Referring to FIG. 10, the loading frame 30 of the cassette loading unit 100 is attached to the chassis 15, for overlying the cassette loading section 101 on the chassis 15, by means of attachment lugs 30a, 30b secured to the chassis 15 with set screws 30c.

A shutter opening/closure arm 31' is mounted on the upper surface of the cassette holder 28 of the cassette loading unit 100 so that the arm is rotationaly biased by means of a spring 32'. When the disc cassette is introduced into the cassette holder 28, the shutter opening/closure arm 31' is rotated against the bias of the spring 32' for moving a shutter, not shown, adapted for opening or closing a recording/playback aperture, also not shown, provided in the disc cassette.

Figure 9:
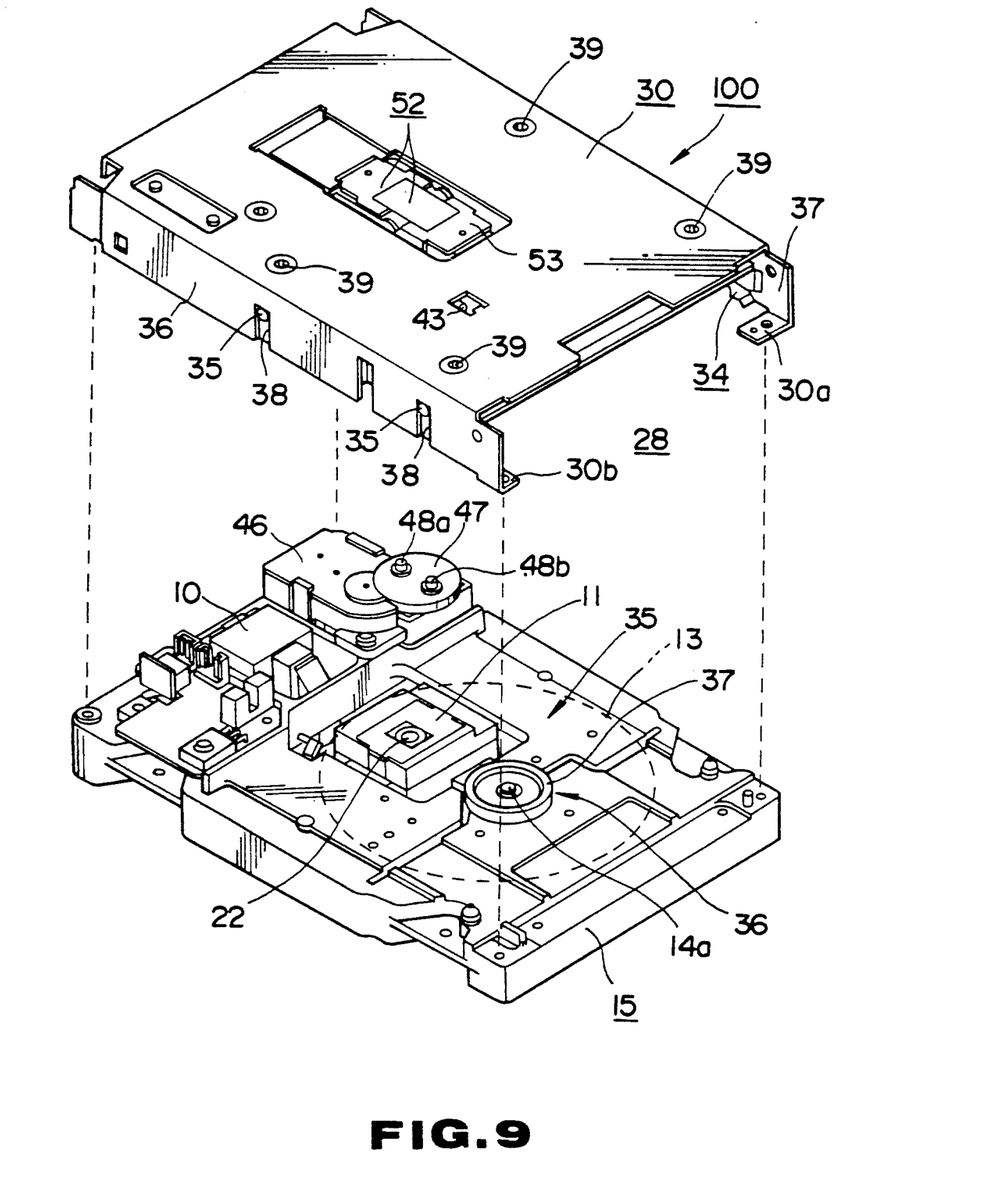
FIG. 9 is an exploded perspective view showing an example of application of the present invention to an optical disc drive device provided with a cassette loading unit, and shown with the cassette loading unit detached from the chassis.

The cassette holder 28 is arranged in a space between the loading frame 30 and the chassis 15 by engaging a plurality of supporting pins 35 formed on substantially U-shaped cassette holding flanges 33, 34 on both opposite sides of the cassette holder 28 in plural vertical guide grooves 38 formed in opposite side wall sections 36, 37 of the loading frame 30, as shown in FIGS. 9 and 10. The cassette holder 28 may be moved vertically with respect to the cassette loading section 101 on the upper surface of the chassis 15 by the supporting pins 35 being guided along the guide grooves 38.

The ejecting plate 29 of the cassette loading unit 100 is mounted sildably on the lower surface of an upper plate section of the loading frame 30. That is, the ejecting plate 29 has a plurality of elongated slide guide holes 40 engaged by a plurality of slide guide pins 39 set on the lower surface of the upper plate section of the loading frame 30, so that the ejecting plate 29 is supported for sliding in the directions shown by arrows C and D in FIG. 6 within the extent of these slide guide holes 40. The ejecting plate 29 is biased at all times in the direction indicated by arrow C in FIG. 6 by a tension spring 43 provided between a spring retainer 41 on the ejecting plate 29 and a spring retainer 42 formed by segmenting a part of the upper plate section of the loading frame 30.

Cassette holder supporting lugs 45, each formed with an inclined cam groove 44, are formed on opposite sides of the ejecting plate 29. These inclined cam grooves 44 are engaged by supporting pins 35 formed on both lateral sides of the cassette holder 28. When the ejecting plate 29 is slid in the directions shown by arrows C and D in FIG. 6, the supporting pins 35 engaged in the inclined cam grooves 44 are moved vertically for vertically moving the cassette holder 29 with respect to the cassette loading section 101, with the supporting pins 35 being guided along the guide grooves 38 formed in the loading frame 30.

The ejecting plate 29 is slid by an ejecting plate driving motor 46 provided on the chassis 15 in the direction shown by arrow D in FIG. 6 against the bias of the tension spring 43. This operation is realized by rotation of an ejection plate driving gear 47 coupled to the ejecting plate driving motor 46 by means of a coupling gearing, not shown. A pair of ejecting plate driving pins 48a, 48b are provided on the major surface of the driving gear 47 with offset relative to the center of rotation of the driving gear. A square-shaped hole 49, engaged by the driving pins 48a, 48b, is formed at a rear side of the ejecting plate 29. A thrusting piece 51 thrust by the ejecting plate driving pins 48a, 48b is provided as one with the ejecting plate 29 for being intruded into the square-shaped hole 49 in a direction at right angles to the sliding direction of the ejecting plate 29, as shown in FIG. 6.

Figure 11A:
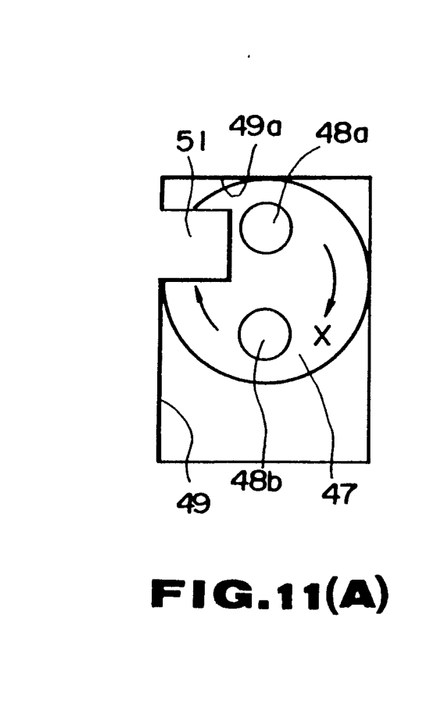
FIGS. 11A to 11D are plan views showing the state of movement of an ejecting plate by an ejecting plate driving gear.
Figure 11B:
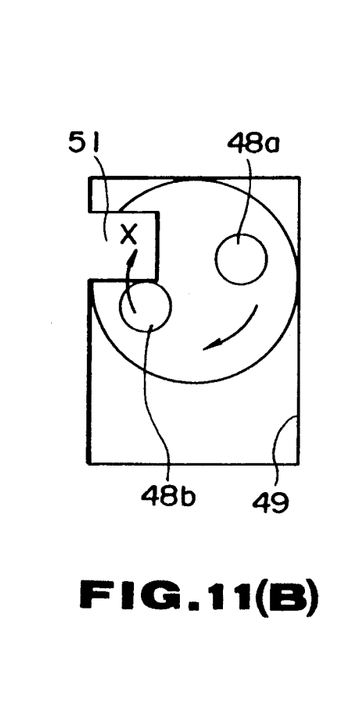
Figure 11C:
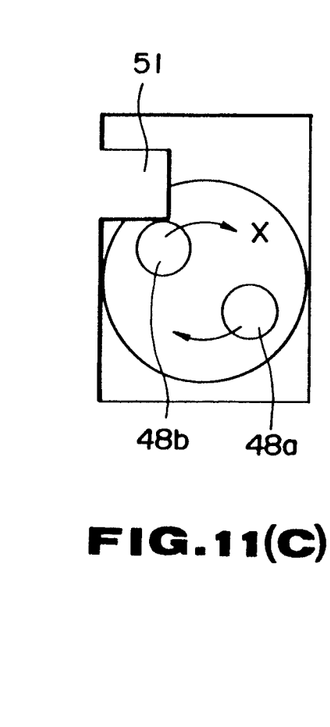
Figure 11D:
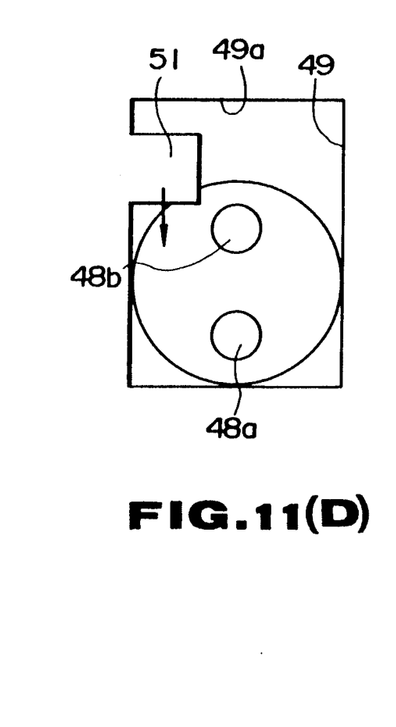

In an initial state of the ejecting pate 29 in which the ejecting plate is moved in the direction of arrow C in FIG. 6 under the bias of the tension spring 43, the driving pin 48a ia abutted against a rear edge 49a of the hole 49, as shown in FIG. 11A. If the driving motor 46 is now set into operation for rotating the driving gear 47 in a direction shown by arrow X in FIG. 11, the second driving pin 48b is abutted against the thrusting piece 51, as shown in FIG. 11B. If the driving gear 47 is rotated further in the direction shown by arrow X in FIG. 11, the second driving pin 48b thrusts the thrusting piece 51 in a direction shown by arrow D as shown in FIG. 11C. As a result thereof, the ejecting plate 29 is slid in the same direction shown by arrow D, against the bias of the tension spring 43, for moving the cassette holder 29 along the inclined cam groove 44 to a raised position with respect to the cassette loading section 101 for ejecting the disc cassette introduced into and held by the cassette holder 29. After ejection of the disc cassette, the driving motor 46 continues its rotation for rotating the driving gear 47 in the direction shown by arrow X in FIG. 11. If the driving gear 47 continues its rotation in this manner, the second driving pin 48b is moved past the thrusting piece 51, as shown in FIG. 11D, so that the ejecting plate 29 is moved in the direction shown by arrow C in FIG. 6 under the bias of the tension spring 43 so as to be reset to its initial position.

A magnetic head 52 for supplying the optical head 13 with an external magnetic field for recording desired information signals on the optical disc 13 in conjunction with the light beam radiated to the optical disc 13 by the above-mentioned movable pickup device 11 is provided at a mid position on the upper surface of the loading frame 30. The magnetic head 52 is rotatably supported by the loading frame 53 via a rotating supporting frame 53. The rotating supporting frame 53 has its proximate end supported by the loading frame 30 via a rotary shaft, not shown, and is rotated about the rotary shaft as a result of the vertical movement of the cassette holder 29 with respect to the cassette loading section 101 so as to be moved towards and away from the optical disc 13 loaded on the cassette loading section 101.

Figure 12:
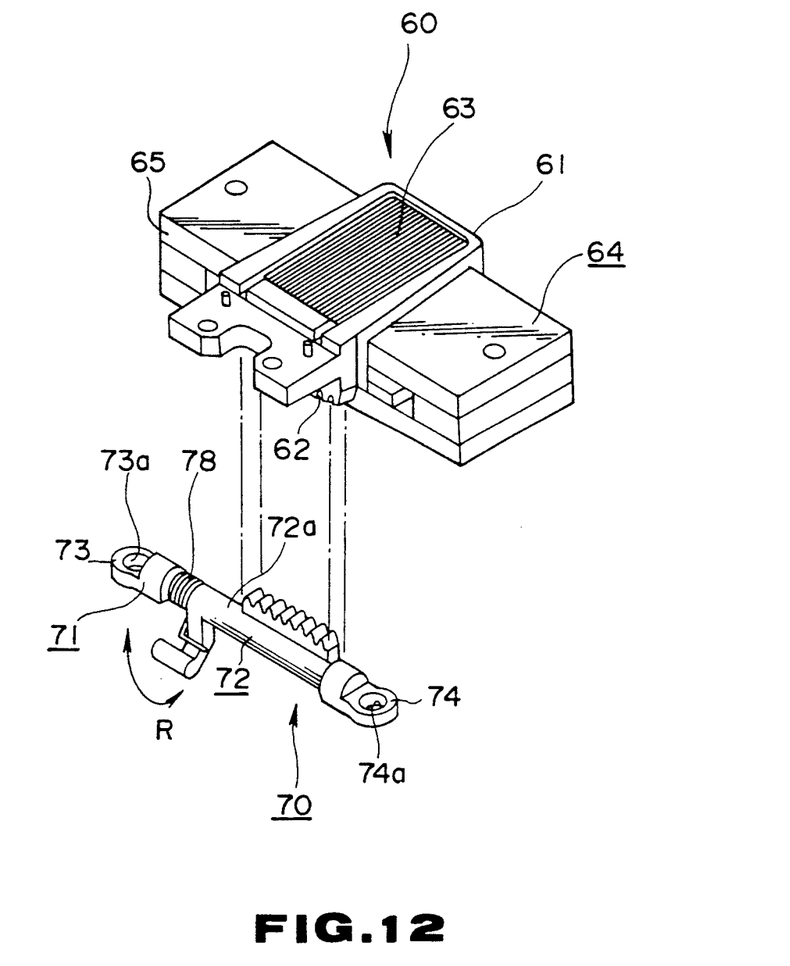
FIG. 12 is a perspective view showing a locking device of the movable pickup device and a linear motor.

The chassis 15 of the optical disc drive device according to the present invention is also provided with a locking device 70 for locking the optical disc 13 of the movable pickup device 11 against movement in the radial direction of the optical disc 13 in the non-operative state of the optical disc drive device or during the unloading operation of ejecting the disc cassette loaded on the cassette loading section 101. Referring to FIG. 12, the locking device 70 is made up of rotating supporting shafts 71 mounted on the chassis 15 and a locking arm 72 introduced into the shafts 71 so as to be rotated about the axis of the rotating supporting shafts 71.

Figure 13:
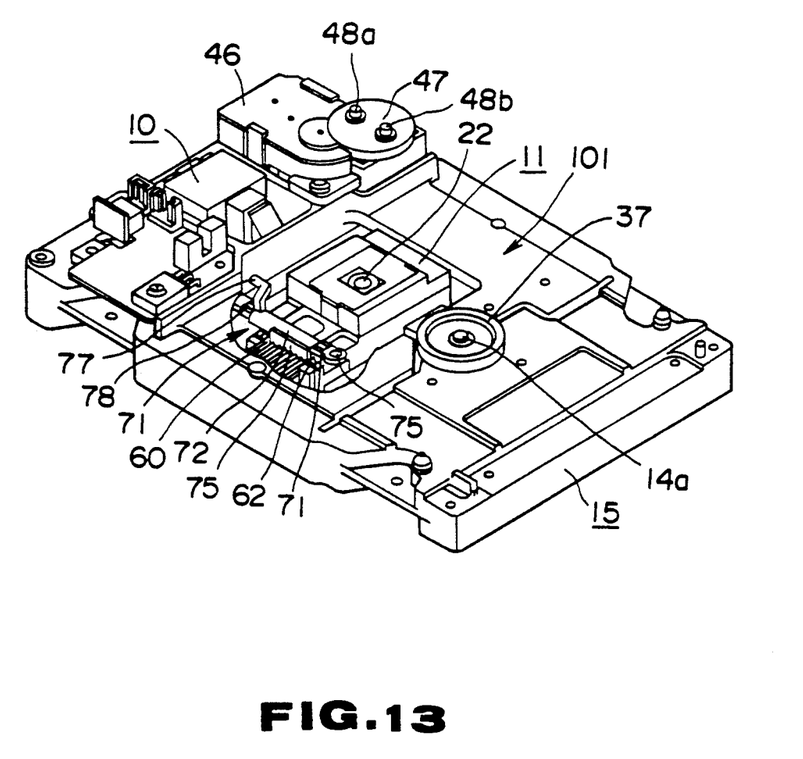
FIG. 13 is a perspective view showing the state of attachment of the locking device for the movable pickup device to the chassis.

The rotating supporting shafts 71 are mounted on the chassis 15 by introducing set screws 75 into tapped holes 73a, 74b formed in attachment end sections 73, 74, as shown in FIG. 13. The locking arm 72 is supported for rotation by introducing a tubular section 72a thereof into the rotating supporting shafts 71. The tubular section 72a is formed with an axially extending locking rack gear 75 adapted for being selectively engaged with a rack gear 62 formed on the lateral side of a movable section 61 of the linear motor 60. One end of the locking arm 72 is provided with a projecting part 77 thrust by an unlocking piece 76 provided on the rear part of the cassette holder 28 movable vertically with respect to the cassette loading section 101 set on the chassis 15, as shown in FIG. 6.

The locking arm 72 is biased into rotation in the direction shown by arrow R in FIGS. 12 and 13 by a torsion coil spring 78 which is wrapped around the rotating supporting shaft 71 and which has its one end retained by the projecting part 77. That is, the locking arm 72 is mounted on the rotating supporting shaft 71 by being biased by the torsion coil spring 78 in such a manner that the distal end of the projecting part 77 is protruded towards the cassette loading section 101, as shown in FIG. 13. At this time, the locking rack gear 75 is engaged with the rack gear 62 for locking the movable part 61 of the linear motor 60 and hence the movable pickup device 11 coupled to the movable part 61 in an immobilized state.

Meanwhile, the linear motor 60, adapted for shifting the movable pickup device 11, has a driving coil 63 wrapped around its movable part 61 which is passed over a yoke 65 of a magnetic circuit section 64 operating as a stationary side.

The operation of loading the disc cassette on the optical disc drive device provided with the above mentioned cassette loading unit 100 is hereinafter explained. For loading the disc cassette, it is introduced into the cassette holder 28 via the cassette inlet/outlet, with the cassette holder 28 being then in a state of being floated away from the cassette loading section 101. As the disc cassette is introduced into the cassette holder 28 in this manner, the cassette holder 28 is lowered towards the cassette loading section 101 for loading the disc cassette inserted into and held by the cassette holder 28 on the cassette loading section 101. At this time, the optical disc 13 accommodated in the disc cassette is held for rotation in unison with the disc table 25.

As the cassette holder 28 is lowered towards the cassette loading section 101, the projecting part 77 of the locking device 70 is thrust by the unlocking member 76 of the cassette holder 28, so that the locking arm 72 is rotated in the direction opposite to arrow R in FIG. 13 against the bias of the torsion coil spring 78. With the locking arm 72 thus rotated in the direction opposite to that shown by arrow R in FIG. 13, the locking rack gear 75 is disengaged from the rack gear 62 of the movable side of the linear motor to allow for movement of the movable part 61 of the linear motor 60. If the optical disc drive device is set to the recording or playback mode, and the linear motor 60 is supplied with an electric current, the movable pickup device 11 is moved along the radius of the optical disc 13, by operation of the linear motor 60, so that information signals may be recorded or reproduced on or from the optical disc 13 rotated by the spindle motor 14.

If, with the recording or playback mode of the optical disc drive device, the recording or reproducing mode is teerminated and an ejecting operation of ejecting the disc cassette, loaded in the cassette loading section 101, from the cassette loading section 101, is discontinued, a control signal is outputted from the driving controlling unit 12b of the controlling system 12 controlling the optical disc drive device, so that the linear motor 60 is driven for moving the movable pickup device 11 towards the stationary optical unit 10. The linear motor 60 continues to be driven until the movable pickup device 11 is proximate to the optical unit 10.

When the movable pickup device 11 is moved to the position proximate to the optical unit 10, the first and second hoods 3 and 4 are fitted one into the other for closing the second light incident-light outgoing section 2 provided on the movable pickup device 11 and the first light incident-light outgoing section 1 provided on the optical unit 10.

A control signal for driving the ejecting plate driving motor 46 is then outputted from the driving controlling unit 12b of the controlling system 12. When the driving motor 46 is driven in this manner, the ejecting plate 29 is slid in the direction of arrow D in FIG. 6, against the bias of the tension coil spring 43, for raising the cassette holder 29 relative to the cassette loading section 101 along the inclined cam groove 44 for ejecting the disc cassette introduced into and held by the cassette holder 29. When the cassette holder 29 is moved to the raised position in this manner, the unlocking piece 76 ceases to thrust the projecting part 77, so that the locking arm 72 is rotated, under the bias of the torsion coil spring 78, in the direction shown by arrow R in FIG. 13. The locking rack gear 75 is engaged with the rack gear 62 of the movable side of the linear motor for locking the movable part 61 of the linear motor 60 in an immobilized state. As a result thereof, the movable pickup device 11 is held at the position proximate to the optical unit 10, so that the first and second hods 3, 4 continue to be engaged with each other for maintaining the closed state of the second light incident-light outgoing section 2 of the movable pickup device 11 and the first light incident-light outgoing section 1 of the optical unit 10.

That is, with the present optical disc drive device, when an ejecting operation of ejecting the disc cassette, once loaded on the cassette loading section 101, is effectuated, the first and second hoods 3, 4 of the movable pickup device 11 and the optical unit 10 are engaged with each other for closing the first and second light incident-light outgoing sections 1 and 2. When the optical disc drive device is not in use, the movable pickup device 11 is locked against movement by the locking device 70 for maintaining the engagement of the first and the second hoods 3 and 4 and the closure of the first and second light incident-light outgoing sections 1 and 2. In this manner, dust and dirt or the like foreign matter may be prevented from being deposited on the light incident-light outgoing sections 1, 2.

What is claimed is:

1. An optical disc drive device comprising an optical unit and a movable pickup, said optical unit having a light source for radiating a light beam towards an optical disc and a light receiving section for receiving a return light beam reflected from said optical disc, said optical unit being fixedly provided on a chassis, said movable pickup having an object lens for converging the light beam radiated from said light source to the surface of said optical disc and driving means for driving said object lens at least in a direction along its optical axis, said movable pickup being supported on said chassis for movement along the radius of said optical disc, said optical disc drive device further comprising a first light incident-light outgoing section for the light beam provided on said optical unit, a second light incident-light outgoing section for the light beam provided on said movable pickup for facing said first light incident-light outgoing section, and a first hood and a second hood provided on said first and second light incident-light outgoing sections, respectively, said first and the second hoods being fitted one into the other when said movable pickup approaches said optical unit.

2. An optical disc drive device as claimed in claim 1 wherein one of said first and the second hoods is larger in diameter than the other to permit the first and the second hoods to be fitted one into the other without contact.

3. An optical disc drive device as claimed in claim 1 further comprising driving means for driving said movable pickup section in a direction along the radius of said optical disc, cassette loading means for loading a disc cassette having the optical disc rotatably housed therein in a cassette loading position or ejecting said disc cassette loaded in said cassette loading position from said cassette loading position, and controlling means for ejecting said disc cassette by said cassette loading means, on reception of a command for ejecting the optical disc, after said movable pickup device is moved to close to said optical pickup section by said pickup driving means.

4. An optical disc drive device as claimed in claim 3, further comprising locking/unlocking means for unlocking or locking the movement of said movable pickup section in a direction along the radius of said optical disc on loading the disc cassette by said cassette loading means and on ejecting the disc cassette, respectively.

5. An optical disc drive device as claimed in claim 1, further comprising biasing means for biasing said movable pickup device towards said optical unit, and locking/unlocking means for locking said biasing means when said optical disc drive device is supplied with an electric current, said locking/unlocking means unlocking said biasing means when the optical disc drive device ceases to be supplied with an electric current to permit said biasing means to bias said movable pickup section.

6. An optical disc drive device as claimed in claim 5 wherein said biasing means is an electro-magnetic plunger.

* * * * *